United States Patent [19]

Cogliati

[11] Patent Number: 5,391,364

[45] Date of Patent: * Feb. 21, 1995

[54] INORGANIC OXIDE AEROGEL MICROBEADS OF NARROW PORE DIAMETER DISTRIBUTION AND THE METHOD FOR THEIR PREPARATION

[75] Inventor: Guido Cogliati, Rome, Italy

[73] Assignee: Enichem Partecipazioni S.p.A., Milan, Italy

[ * ] Notice: The portion of the term of this patent subsequent to Feb. 23, 2010 has been disclaimed.

[21] Appl. No.: 690,305

[22] Filed: Apr. 24, 1991

[30] Foreign Application Priority Data

Apr. 24, 1990 [IT] Italy .................... 20126A/90

[51] Int. Cl.$^6$ .................... C01B 33/12; B01J 21/08
[52] U.S. Cl. .................... 423/335; 423/592; 423/593; 502/232; 502/240; 502/242; 502/251; 502/306; 502/325; 502/340; 502/349; 502/350; 502/353
[58] Field of Search .................... 502/237, 239, 242, 251, 502/232, 240, 306, 325, 340, 349, 350, 355; 423/335, 338, 592, 593; 264/42

[56] References Cited

U.S. PATENT DOCUMENTS

| | | | |
|---|---|---|---|
| 3,535,232 | 10/1970 | Lawrance et al. | 502/237 |
| 3,862,104 | 1/1975 | Witt | 502/237 |
| 4,150,101 | 4/1979 | Schmidt et al. | 423/338 |
| 4,225,464 | 9/1980 | Scholten et al. | 502/237 |
| 4,246,137 | 1/1981 | Dombro et al. | 423/338 |
| 4,299,731 | 11/1981 | McDaniel et al. | 502/237 |
| 4,610,863 | 9/1986 | Tewari et al. | 502/10 |
| 4,776,867 | 10/1988 | Onorato et al. | 423/338 |
| 4,845,056 | 7/1989 | Yamanis | 501/12 |
| 4,851,150 | 7/1989 | Hench et al. | 501/12 |
| 4,851,373 | 7/1989 | Hench et al. | 264/42 |
| 4,981,819 | 1/1991 | Rinn | 501/12 |
| 5,189,000 | 2/1993 | Masi et al. | 502/117 |

FOREIGN PATENT DOCUMENTS

| | | |
|---|---|---|
| 0149816 | 7/1985 | European Pat. Off. . |
| 0280673 | 8/1988 | European Pat. Off. . |
| 0298062 | 4/1989 | European Pat. Off. . |
| 0363927 | 4/1990 | European Pat. Off. . |
| 2170189 | 7/1986 | United Kingdom . |
| 2196621 | 10/1986 | United Kingdom . |

*Primary Examiner*—Anthony McFarlane
*Attorney, Agent, or Firm*—George P. Hoare, Jr.

[57] ABSTRACT

Microbeads of aerogels of one or more oxides are characterised by a high porosity and the fact that at least 90% of the pores present have a diameter lying within a very narrow range. The surface area exceeds 300 m$^2$/g and more frequently exceeds 500 m$^2$/g, the total pore volume exceeding 1 ml/g.

6 Claims, No Drawings

INORGANIC OXIDE AEROGEL MICROBEADS OF NARROW PORE DIAMETER DISTRIBUTION AND THE METHOD FOR THEIR PREPARATION

FIELD OF THE INVENTION

This invention relates to microbeads of aerogels of one or more inorganic oxides characterised by low density, high porosity and a narrow pore diameter distribution, the microbeads being particularly suitable for use as supports for catalysts for the polymerization of olefinically unsaturated compounds. It also relates to the method for preparing the microbeads.

BACKGROUND OF THE INVENTION

Inorganic oxide aerogels, especially of metal oxides, are well known in the state of the art in relation to a good number of applications. For example they can be used as catalysts, catalyst supports, adsorption means, chromatographic column packing, pigments, opacifiers, abrasives and for other purposes.

Examples of their use as catalysts or catalyst supports are given in U.S. Pat. No. 3,673,111 (preparation of phosphoric acids) and in the article in "Journal of Molecular Catalysis", Vol. 17, 219-223 (1983) (radium catalyst support in the preparation of olefins from CO and $H_2$). They are also used as catalyst supports in the preparation of phthalic anhydride and the decomposition of hydrogen peroxide.

Normally the known powders, and particularly those used as catalyst supports, consist of inorganic oxides obtained by precipitating hydroxides from aqueous solutions of the corresponding cations, followed by calcining.

Powders obtained in this manner generally have a very low specific surface and porosity, the spherical particles do not always possess suitable mechanical properties, and their particle size distribution is very wide, which sometimes discourages their use for the intended application. In this respect it is not infrequently the case that catalytic systems obtained using such powders do not enable the required reactions to be conducted with good productivity, which means that increasing catalyst quantities have to be used, requiring subsequent costly wash processes for the catalyst residues.

Various methods of preparing aerogels are known, independently of their final use.

For example the article in "Advances in Colloid and Interface Science", 5 (1976) 245-273 describes a general method for preparing $SiO_2$, $Al_2O_3$, MgO and other aerogels by hydrolysis and polycondensation of the alcoholate of the metal concerned, followed by drying under supercritical conditions. However with this method it is not possible to control the size distribution of the spherical particles and maintain a large percentage within a narrow pore diameter range.

European patent 213,987 relates to catalyst supports in the form of spheroidal silica particles obtained by granulating an $SiO_2$hydrosol with an $SiO_2$ aerogel and drying. The surface area of the product obtained never exceeds 500 $m^2/g$.

U.S. Pat. No. 4,246,137 describes a method for preparing silica-zirconia xerogels by reacting a zirconium compound with an alkaline metal silicate, ageing the hydrogel obtained, washing and finally drying. The product obtained in this manner has a total pore volume of between 1.5 and 3.5 ml/g, a surface area of between 200 and 600 $m^2/g$, but a pore diameter range of 200-600 Å.

SUMMARY OF THE INVENTION

The present applicant has found it possible to isolate microbeads of inorganic oxide aerogels which as such can be used as catalysts or catalyst supports, or for other uses in accordance with the teachings of the known art, the microbeads being characterised by low density, high porosity and a narrow pore diameter distribution, within any desired range of values.

A first aspect of the present invention is therefore a powder consisting of microbeads of aerogels of one or more inorganic oxides and distinguished by a surface area exceeding 300 $m^2/g$, and in particular exceeding 500 $m^2/g$, a total pore volume exceeding 1 ml/g, and a narrow pore distribution, by which is meant that at least 90% of the pores present in said microbeads have substantially the same diameter or a diameter lying within a range having a width never exceeding 50 Å, said diameter being between 50 and 1000 Å.

A further aspect of the present invention is the process for preparing said microbeads, the process comprising essentially the following operations:

hydrolyzing one or more derivatives of the metals of interest;

transforming the colloidal solution into droplets of the desired diameter;

sol/gel passage;

washing the gel;

drying under hypercritical conditions.

Specifically, the process for preparing microbeads according to the present invention comprises the following basic operations:

a) preparing a colloidal solution (sol) of an oxide of a metal of interest or of a mixture of oxides by hydrolyzing an alkoxide or a mixture of alkoxides in the presence of a catalyst and a substance which favours the formation of pores of desired uniform dimensions in the gel particles obtained as stated under c); one or more alkoxides can be replaced by the relative halides;

b) transforming the colloidal solution obtained into droplets of the desired diameter, and dispersing them in a medium immiscible with the sol;

c) transforming the sol droplets into gel particles;

d) washing the gel particles with a suitable solvent;

e) drying under hypercritical conditions.

The powder obtained can be finally calcined to eliminate any organic substances still present or to give the powder particular characteristics.

DETAILED DESCRIPTION OF THE INVENTION

The colloidal solution in accordance with a) is prepared by mixing at least one alkoxide with water. This is not miscible with the alkoxide whereas the hydrolysis products are miscible with water, which accounts for the clarity of the solution on completion of the alkoxide hydrolysis.

Alkoxides of metals pertaining to one of Group II to Group VI or to Group VIIB or Group VIII of the Periodic Table of Elements can be used for preparing the sol of interest. The use of Al, Si, Ti, B, La, Zr, Cr, Sn and Mg alkoxides is particularly important. As stated, powders can be prepared with a single oxide or with mixed oxides, in which case the hydrolysis of point a) is carried out on a suitable mixture of alkoxides or a mixture of alkoxides and chlorides.

The hydrolysis is conducted in the presence of a catalyst consisting of an acid, a base or an inorganic salt. The hydrolysis kinetics, the particle size and the pore diameter can be controlled by suitably adjusting the water/alkoxide ratio, the pH and/or the temperature of the system. If preparing an oxide mixture the second component can be added as a salt (preferably chloride) to the alkoxide of the first component already partially hydrolyzed. In this manner a polycondensation product is obtained in which the two metals are uniformly dispersed and connected together by oxygen bridges.

The characteristics of the colloidal solution following hydrolysis and partial polycondensation of the alkoxide can be further controlled by removing part of the solvent consisting of the excess water and the formed alcohol, for example by low temperature evaporation.

Modifications can also be made by adding substances able to coordinate with the polymer, such as glycols, dimethylformamide or organic acids. In addition to dimethylformamide, ethylene glycol and oxalic acid are of interest.

It is therefore apparent from the aforegoing that the sol polymer concentration and the modifying agent concentration can be varied, with consequent variation within narrow limits of the mean pore diameter, the total pore volume, and the surface area of the gel and aerogel which are obtained following the sol treatment and the subsequent drying and calcining.

The colloidal solution prepared in accordance with a) is then transformed into sol droplets of the desired size. Operation b) can be conducted by conventional methods, including mechanical stirring or spraying.

If mechanical stirring is to be used, the sol is added to an organic solvent with which it is immiscible. The mixture is stirred until an emulsion is obtained, this being facilitated by adding a surfactant. During this step it is still possible to control the mean diameter of the sol droplets dispersed in the solvent such that their diameters are contained within a sufficiently restricted range, by for example varying the type of solvent and surfactant, varying the ratio of collodial solution volume to solvent volume, varying the type and concentration of the surfactant, or varying the rotation speed of the stirrer. The mechanical stirring method is particularly suitable where droplets of up to 100 $\mu$m diameter are required, whereas droplets of diameter up to 1000 $\mu$m are more easily prepared by spraying, for example by injecting the sol directly into a solvent stream. The sol droplets produced by one of these methods are then transformed into gel microbeads. This transformation can happen directly as the final result of the polycondensation reaction, or can be suitably accelerated by extracting a part of the solvent or by extracting anions. Extraction of part of the water from the sol droplets is achieved using an anhydrous solvent in which the water can partially dissolve. For example a high molecular weight alcohol can be used.

The anions present in the sol droplets can be extracted by adding to the solvent a predetermined quantity of a liquid anion exchanger such as an aliphatic amine.

The reason for washing the gel particles is to remove the surfactant and/or the anion exchanger present and, if appropriate, to replace the solvent used for sol dispersion by a chemical compound of low critical temperature and pressure.

During the drying stage under hypercritical conditions, the media mostly used are methyl alcohol, ethyl alcohol and carbon dioxide. For their drying under hypercritical conditions the gel particles are placed in a pressure vessel together with the solvent in a sufficient quantity to cover them completely. An inert gas is then fed into the pressure vessel at a pressure such as to prevent the solvent boiling while being heated to its critical temperature. During the heating of the pressure vessel the pressure increases and exceeds the critical pressure of the solvent. Having exceeded the critical pressure and temperature of the solvent the temperature is maintained constant and the pressure is slowly reduced to atmospheric pressure. At this point the pressure vessel heating furnace can be turned off and the pressure vessel allowed to cool naturally to ambient temperature.

The treatment of the gel particles at high temperature and pressure can modify their structure and chemical composition, to cause for example the precipitation of one component or its transformation from amorphous to crystalline. If for example a gel has been obtained consisting of an inorganic polymer formed from silicon and titanium atoms with oxygen atoms between, the drying at high temperature and pressure can cause the titanium oxide to dissolve and be precipitated in the form of anatase. The mixed silicon and titanium oxide support is then dishomogeneous, consisting of a silica matrix containing islands of crystalline titanium oxide (anatase). To prevent this, the solvent containing the gel particles is replaced at ambient temperature by liquid carbon dioxide in a pressure vessel. When this replacement has been effected, the pressure vessel temperature is raised to above the critical temperature of carbon dioxide (32° C.). At this point the pressure also exceeds the critical pressure of $CO_2$ (73 bars), and the pressure can therefore be reduced while maintaining the temperature constant, as already described. The silica-titanium oxide gel particles obtained in this manner are perfectly homogeneous and amorphous.

The aerogel particles are then calcined to remove all traces of organic compound still present and to provide the necessary chemical and mechanical stability to allow their easy use as a catalyst support.

The aerogel particles are perfectly spherical in shape with a size of between 10 and 1000 $\mu$m and a dispersion not exceeding 20%.

Their porosity (total pore volume) and surface area depend on the mean diameter of the pores present.

This diameter can vary within a wide range, of between 50 and 1000 Å, but at least 90% of the microbeads have the same diameter, or a diameter lying within a very narrow range (for example 100–150 Å; 20–30 Å).

As stated, the surface area depends on the pore diameter, to which it is inversely proportional, but in all cases it is very high, exceeding 300 $m^2/g$, and in particular exceeding 500 $m^2/g$.

The characteristics and preparation of the aerogels according to the present invention will be more apparent on reading the following illustrative examples, which however are in no way to be considered limitative of the invention.

DESCRIPTION OF THE PREFERRED EMBODIMENTS

EXAMPLE 1

100 ml of TEOS (tetraethylorthosilicate) are added to 100 ml of 0.01 N HCl and subjected to vigorous mechanical stirring at ambient temperature.

After about 30 minutes a perfectly clear colloidal solution (sol) is obtained.

The pH of this solution is increased from 2.4 to 5 by adding 0.1 N $NH_4OH$ dropwise.

100 ml of the colloidal solution obtained as described are poured into a mixture consisting of 400 ml of 1,1,1-trichloroethane, 200 ml of n-hexane and 5 g of SPAN 20, and stirred mechanically.

An emulsion is obtained consisting of small sol droplets which after about 30 minutes are transformed into spherical gel particles.

Stirring is interrupted and the gel particles which collect on the bottom of the container are washed three times with 100 ml of ethyl alcohol decanting each time. The gel particles are finally covered with ethyl alcohol and placed in a pressure vessel. Nitrogen is fed into the pressure vessel to a pressure of 60 bars, after which the temperature of the pressure vessel is raised from ambient to 300° C. The pressure vessel pressure increases to 110 bars by the effect of the heating. After about one hour the pressure in the pressure vessel is gradually reduced (50 bar/hour) to atmospheric pressure and the pressure vessel is cooled.

A powder is obtained consisting of spherical $SiO_2$ particles having a diameter of between 60 and 90 $\mu$m, a surface area (BET) of 890 $m^2$/g, and a pore volume of 1.55 ml/g. 90% of the pores present in the particles have a diameter of between 45 and 60 Å.

EXAMPLE 2

100 ml of TEOS (tetraethylorthosilicate) are added to 100 ml of 0.01 N HCl and subjected to vigorous mechanical stirring at ambient temperature.

After about 30 minutes a perfectly clear colloidal solution (sol) is obtained.

This solution is distilled under vacuum at 30° C. to reduce its volume from 200 ml to 150 ml.

100 ml of the concentrated sol solution obtained as described are poured into a mixture consisting of 400 ml of 1,1,1-trichloroethane, 200 ml of n-hexane and 5 g of SPAN 20, and stirred mechanically.

5 ml of Primene JMT diluted in 50 ml of n-hexane are added dropwise to the emulsion thus obtained. The emulsion is kept stirring for 30 minutes. The gel particles obtained are washed with ethyl alcohol and dried in a pressure vessel under hypercritical conditions as described in Example 1.

A powder is obtained consisting of spherical $SiO_2$ particles having a diameter of between 90 and 100 $\mu$m, a surface area of 296 $m^2$/g, and a total pore volume of 1.97 ml/g. 95% of the pores present in the particles have a diameter of between 100 and 150 Å.

EXAMPLE 3

100 ml of TEOS (tetraethylorthosilicate) are added to 100 ml of 0.01 N HCl and subjected to vigorous mechanical stirring at ambient temperature.

After about 30 minutes a perfectly clear colloidal solution (sol) is obtained.

This solution is distilled under vacuum at 30° C. to reduce its volume from 200 ml to 100 ml.

This latter quantity is poured into a mixture consisting of 400 ml of 1,1,1-trichloroethane, 200 ml of n-hexane and 5 g of SPAN 20, and stirred mechanically.

5 ml of Primene JMT diluted in 50 ml of n-hexane are added dropwise to the emulsion thus obtained. The emulsion is kept stirring for 30 minutes. The gel particles obtained are washed with ethyl alcohol and dried in a pressure vessel under hypercritical conditions as described in Example 1.

A powder is obtained consisting of spherical $SiO_2$ particles having a diameter of between 100 and 120 $\mu$m, a surface area of 86 $m^2$/g, and a total pore volume of 1.05 ml/g. 90% of the pores present in the particles have a diameter of between 20 and 30 Å.

EXAMPLE 4

A colloidal silica solution is prepared in the manner described in Example 1.

This solution is fed by a pump into the central capillary bulb of a two-fluid sprayer. The second fluid consists of an anhydrous decanol solution containing 1% by weight of SPAN 80. The sol and decanol flow rates are adjusted to obtain sol droplets of 200 $\mu$m diameter which fall into a vertical glass column of 1500 mm height containing decanol.

During their decantation the anhydrous decanol extracts sufficient water from the particles to transform them into gel. Spherical silica gel particles thus collect on the bottom of the glass column.

The gel particles obtained are covered with ethyl alcohol and dried in a pressure vessel under hypercritical conditions as described in Example 1.

A powder is obtained consisting of spherical $SiO_2$ particles having a diameter of between 200 and 250 $\mu$m, a surface area of 350 $m^2$/g, and a total pore volume of 2.05 ml/g. 93% of the pores present in the particles have a diameter of between 100 and 150 Å.

EXAMPLE 5

109.8 ml of TEOS (tetraethylorthosilicate), equivalent to 0.49 moles of $SiO_2$, are added to 50 ml of ethyl alcohol and 9 ml of 0.01 N HCl and maintained at 50° C. under mechanical stirring for 30 minutes. 2.23 ml of titanium isopropylate, equivalent to 0.0075 moles of $TiO_2$, diluted in 20 ml of ethyl alcohol are then added. After 30 minutes the colloidal solution obtained is cooled to 15° C. and 36 ml of 2.01 N HCl diluted in 50 ml of ethyl alcohol are added dropwise. The colloidal solution of $SiO_2$₋₁.₅%$TiO_2$ obtained is kept stirring for one hour and is then distilled under vacuum at 30° C. to reduce its volume to 120 ml.

30 ml of the colloidal solution obtained as described are poured under mechanical stirring into 100 ml of decanol containing 2.6 g of SPAN 80.

While maintaining stirring, 5 ml of Primene JMT diluted in 50 ml of decanol are added dropwise. When the Primere JMT addition is complete the sol droplets are transformed into gel particles, which collect on the bottom of the container.

The gel particles obtained are washed three times with 50 ml of acetone and are then placed in a pressure vessel. Liquid carbon dioxide is then fed into the pressure vessel and mixes with the acetone present. A number of washes with liquid $CO_2$ are carried out until the carbon dioxide leaving the pressure vessel no longer contains acetone. At this point the pressure vessel temperature is raised to 40° C. with consequent pressure increase to 80 bars. After about 30 minutes the pressure in the pressure vessel is reduced to atmospheric pressure.

Spherical particles of $SiO_2$—$_{1.5}\%TiO_2$ aerogel are obtained. X-ray spectrometry shows that their structure is amorphous. The particle diameter is between 150 and 200 μm, the surface area is 920 m²/g, and the total pore volume is 2.5 ml/g. 90% of the pores have a diameter of between 50 and 80 Å.

EXAMPLE 6

109.8 ml of TEOS (tetraethylorthosilicate), equivalent to 0.49 moles of $SiO_2$, are added to 50 ml of ethyl alcohol and 9 ml of 0.01 N HCl and maintained at 50° C. under mechanical stirring for 30 minutes. 0.82 ml of $TiCl_4$, equivalent to 0.0075 moles of $TiO_2$, are then added. After 30 minutes the obtained solution is cooled to 15° C. and 36 ml of water diluted in 50 ml of ethyl alcohol are added dropwise. The colloidal solution of $SiO_2$—1.5%$TiO_2$ obtained is kept stirring for one hour and is then distilled under vacuum at 30° C. to reduce its volume to 120 ml.

The sol dispersion, the gelling into spherical gel particles and their drying are effected as described in Example 5.

The aerogel particles obtained have the same characteristics as those described in Example 5.

I claim:

1. Microbeads of aerogels of one or more oxides selected from those of metals of Groups II to VI, VIIB and VIII of the Periodic Table and of silicon and characterised by a surface area exceeding 300 m²/g, a total pore volume exceeding 1 ml/g, and at least 90% of the pores present have a diameter lying between 50 and 1000 Å, the difference between the maximum and minimum of this range never exceeding 50 Å.

2. Aerogel microbeads as claimed in the preceding claim, wherein the oxide metal is chosen as one or more from Al, Si, Ti, B, La, Zr, Cr, Sn and Mg.

3. Aerogel microbeads as claimed in claim 1, wherein the oxide is $SiO_2$.

4. Aerogel microbeads as claimed in claim 2, wherein the oxide is an $SiO_2$—$TiO_2$ mixture.

5. Aerogel microbeads as claimed in claim 2, wherein the oxide is an $SiO_2$—$M_gO$ mixture.

6. Aerogel microbeads as claimed in claim 2, wherein the oxide is $SiO_2$.

* * * * *